United States Patent [19]

Nomura et al.

[11] Patent Number: 5,626,552
[45] Date of Patent: May 6, 1997

[54] METHOD OF WASTE DISPOSAL

[75] Inventors: Takuji Nomura; Hidekazu Kuromatsu; Masakazu Uekita, all of Kobe, Japan

[73] Assignee: Kanegafuchi Kagaku Kogyo Kabushiki Kaisha, Osaka, Japan

[21] Appl. No.: 464,865

[22] PCT Filed: Nov. 11, 1994

[86] PCT No.: PCT/JP94/01909

§ 371 Date: Jul. 14, 1995

§ 102(e) Date: Jul. 14, 1995

[87] PCT Pub. No.: WO95/13886

PCT Pub. Date: May 26, 1995

[30] Foreign Application Priority Data

| Nov. 15, 1993 | [JP] | Japan | 5-195388 |
| Dec. 28, 1993 | [JP] | Japan | 5-337889 |
| Oct. 20, 1994 | [JP] | Japan | 6-255152 |
| Oct. 20, 1994 | [JP] | Japan | 6-255153 |
| Oct. 20, 1994 | [JP] | Japan | 6-255154 |

[51] Int. Cl.⁶ ........................... B09B 3/00
[52] U.S. Cl. ............ 588/256; 405/128; 588/252
[58] Field of Search ............... 588/3, 14, 252, 588/256, 901; 210/751; 405/128

[56] References Cited

U.S. PATENT DOCUMENTS

| 3,988,258 | 10/1976 | Curtiss et al. | 588/3 |
| 4,505,851 | 3/1985 | Funabashi et al. | 588/14 |
| 4,600,514 | 7/1986 | Conner | 588/252 |
| 4,687,373 | 8/1987 | Falk et al. | 588/252 |
| 5,457,273 | 10/1995 | Glover et al. | 588/252 |

FOREIGN PATENT DOCUMENTS

| 52-109482 | 9/1977 | Japan . |
| 57-204276 | 12/1982 | Japan . |

*Primary Examiner*—George A. Suchfield
*Attorney, Agent, or Firm*—Armstrong, Westerman, Hattori, McLeland & Naughton

[57] ABSTRACT

A method for solidifying industrial waste containing various toxic metals and other substances without fail and stabilizing the waste so as to prevent the toxic metals, particularly lead, from leaching out. The method comprises mixing a waste containing calcium compounds such as hydroxide, oxide and chloride of calcium with a treatment mainly comprising water glass, adding, if necessary, water hereto to adjust the total water content to 25–75 parts by weight per 100 parts by weight of the waste, kneading the resultant mixture, and aging the same for at least 6 hours in a temperature range of 40° to 100° C., preferably by utilizing the waste heat of a waste incinerator.

28 Claims, No Drawings

METHOD OF WASTE DISPOSAL

TECHNICAL FIELD

The present invention relates to a waste treatment method capable of effectively stabilizing wastes containing hazardous metals, and more particularly, to a waste treatment method capable of effectively stabilizing fly ash (resulting from waste incineration) containing lead which is subject to leaching owing to calcium compounds (such as calcium hydroxide, calcium oxide, and calcium chloride) contained therein.

BACKGROUND ART

The prevailing method for treatment of industrial waste containing hazardous metals consists of mixing it with cement and kneading the resulting mixture with water, followed by curing and solidification, so that hazardous metals are stabilized to prevent their leaching. However, simply solidifying industrial waste with cement involves several problems associated with secondary pollution, unless its application is limited. For example, when treatment with cement according to the prior art technology is applied to fly ash collected by an electrostatic precipitator or bag filter at the time of waste incineration, it cannot completely prevent the leaching of lead contained therein in high concentrations. To make matters worse, lead in the ash of waste is more liable to leaching in the alkaline environment, as known well. Since the incinerator for municipal solid waste is fed with slaked lime to suppress the evolution of hydrochloric acid, it gives rise to fly ash containing calcium compounds, such as slaked lime (or calcium hydroxide), calcium chloride (as a reaction product of slaked lime and hydrochloric acid), and calcium oxide (resulting from the heating of slaked lime). Fly ash collected by an electrostatic precipitator or bag filter under such operating conditions contains a large amount of leachable lead. With the prior art technology, it is impossible to completely prevent the leaching of lead. Therefore, at the present time, it is common practice to dump such fly ash without hazardous metals being fully stabilized, and such dumping is presenting problems associated with secondary pollution.

It has become apparent inside and outside the country that it is difficult to stabilize industrial waste containing hazardous metals so as to prevent their leaching by simple solidification with cement. This has stimulated the development of a new waste treatment method which permits safe dumping on land and at sea without the possibility of heavy metals leaching out to cause secondary pollution.

The present invention was completed in view of the current state of waste treatment. Accordingly, it is an object of the present invention to provide a waste treatment method capable of certainly solidifying and sealing industrial waste containing hazardous metals, thereby stabilizing it such that hazardous metals will not leach out after dumping.

DISCLOSURE OF THE INVENTION

The gist of the present invention resides in a waste treatment method which comprises mixing waste containing calcium compounds (such as calcium hydroxide, calcium oxide, and calcium chloride) with a treating agent composed mainly of water glass and optional water such that the total amount of water is 25–75 parts by weight for 100 parts by weight of waste, and kneading the resulting mixture.

The present invention may employ water glass of general-purpose type. Water glass is represented by the formula $M_2O \cdot nSiO_2$ (where M denotes a cation). Examples of the cation (as an alkaline component) include sodium and potassium. Water glass containing sodium as the cation (which is sodium silicate) is preferable from the standpoint of availability and price. In addition, this water glass should preferably contain $M_2O$ and $SiO_2$ in a ratio of from 0.5 to 4 (which is denoted by n) for the same reason as above. The water glass used in the present invention may contain inevitable impurities, such as iron, which will present no problems. The water glass may be available in the form of either solid or liquid.

According to the present invention, the amount of water glass to be added varies depending on the content of lead in waste, the content of calcium compounds in waste, the amount of hazardous metals which would leach out of untreated waste, and the permissible level of leaching regulated by law. In practice, it should be established from the standpoint of cost and estimated leaching. It has turned out that an amount of 3–30 parts by weight (as solids, or the total amount of $M_2O$ and $SiO_2$) for 100 parts by weight of wastes of nearly all sorts is enough to keep the leaching of lead below 3 ppm which is settled by law. With an amount less than specified above, water glass may not completely prevent the leaching of hazardous metals. Conversely, water glass in an excess amount will be wasted. Commercially available water glass is designated as No. 1, No. 2, No. 3, and No. 4 according to specification. No. 3 is suitable for the present invention in view of a balance between solid content and price.

The waste treatment method of the present invention requires that waste be mixed with the treating agent, followed by kneading. Mixing and kneading are important for their intimate contact with each other in order to prevent the leaching of hazardous metals. To this end, it is desirable to previously dilute the treating agent with water or to continue kneading by adding water after its mixing or kneading with waste. The total amount of water contained in the treating agent and to be added optionally should preferably be more than 25 parts by weight for 100 parts by weight of waste. However, excessive water gives rise to a kneaded product which is too soft to handle properly. Moreover, excessive water dilutes the treating agent to such an extent that the possibility of its coming into contact with waste becomes low, with the result that the treating agent does not produce the desired effect of preventing the leaching. With this in mind, the total amount of water should be limited to 75 parts by weight.

What is important in the present invention is the sequence in which the treating agent and water are added to and mixed with waste. For the treating agent to manifest its effect, it should be added to waste first, followed by mixing and kneading, and water should be added subsequently to the resulting mixture, followed by further kneading. If this order is reversed (or water precedes the treating agent), the consequence is the incomplete sealing of hazardous metals. The probable reason for this is that the water added first leaches out hazardous metals from waste before they are caught by the treating agent.

One means to make the water glass to wet waste easily is to lower its viscosity by dilution. Another possible means is to incorporate it with a surface active agent. Moreover, the water glass may be used in combination with other auxiliaries (such as coagulant, precipitating medium, chelating agent, and reducing agent) which will enhance the effect of preventing the leaching of hazardous metals. It is also desirable to use additives which increase the strength of the solidified waste formed by incorporation with the treating agent.

According to the present invention, it is essential that the mixture of waste and the treating agent should be cured after mixing and kneading. Curing is an extremely effective means to make the treating agent to manifest its effect. It is considered that curing slowly continues the reaction between waste and the treating agent which takes place instantaneously upon mixing and kneading.

Curing after kneading should preferably last for more than 6 hours. In general, the strength of the solidified mixture of waste and the treating agent increases with the increasing curing time. Insufficient curing time gives rise to the solidified mixture which is weak and easily broken during transportation to the dumping site or after dumping. The consequence of such an instance is the scattering of dust containing hazardous metals, which leads to environmental pollution. The curing time should be longer than 6 hours; otherwise, there is not enough time for the treating agent to react with calcium compounds in waste and to stabilize hazardous metals in waste, and there is not enough time for the reaction product to become fully stabilized, with the result that the treating agent does not produce its desired effect of stabilizing hazardous metals.

According to the present invention, curing should be carried out at temperatures in the range of 40° C. to 100° C. The adequate curing temperature varies depending on the content of lead in waste, the content of calcium compounds in waste, the amount of hazardous metals which would leach out of untreated waste, and the permissible level of leaching regulated by law. In general, with a curing temperature lower than 40° C., the treating agent does not fully manifest its effect of stabilizing hazardous metals. In the case of a low permissible level of leaching, the object will be achieved by setting the curing temperature rather high. On the other hand, curing at high temperatures above 100° C. will greatly impair the performance of the treating agent because it brings about the rapid evaporation of water from waste which leads to the loss of water required for waste to solidify completely. Moreover, insufficient water results in loose products after curing, which are liable to the scattering of hazardous metals during transportation which leads to environmental pollution. Therefore, the curing temperature in excess of 100° C. should be avoided. In consideration of adequate working conditions, the curing temperature should preferably be in the range of 40° C. to 80° C.

The waste treatment method of the present invention as mentioned above is also useful in the case where there is no sufficient space for curing in the waste disposal site. In other words, curing at a proper temperature in the present invention reduces the curing time for the mixture of waste and the treating agent. This makes it possible to dump treated waste rapidly.

The curing of the mixture of waste and the treating agent needs heat if it is to be carried at the specified temperature. Heat required for curing may be supplied from steam (or electricity generated by steam) which is evolved by incineration. Usually, steam is readily available by heat exchange in the waste disposal facility where the incinerator is provided with a unit for treating fly ash discharged from the incinerator. Use of recovered steam is desirable for energy efficiency.

According to a preferred embodiment of the present invention, the waste treatment method involves curing at 40° C. to 100° C. for more than 6 hours so that it produces its utmost effect.

In the present invention, the mixing and kneading of waste with the treating agent may be accomplished by using a variety of mixers and kneaders, whose selection depends on the properties of waste and the amount of the treating agent. In addition, it is permissible to add a proper amount of water as required at the time of mixing and kneading.

The waste treatment method of the present invention is useful particularly for the treatment of fly ash evolved from incineration of municipal wastes. It is generally known that fly ash collected by an electrostatic precipitator or bag filter contains lead which is subject to leaching under the alkaline condition. Fly ash originating from incineration of municipal wastes contains a large amount of leachable lead because slaked lime is fed into the incinerator in order to reduce the amount of hydrochloric acid which is evolved during incineration. With the conventional technology, it has been impossible to prevent the leaching of lead completely. By contrast, the treatment with water glass in the present invention is extremely effective in preventing the leaching of lead. The mechanism of this effect is not yet fully elucidated. Presumably, the water glass forms gel upon reaction with slaked lime (calcium hydroxide) in fly ash, reaction products (calcium chloride) of slaked lime and hydrochloric acid, products (calcium oxide) formed by heating of slaked lime, compound salts thereof, and other calcium salts and other metal salts. The gel, in turn, seals and solidifies basic components (such as slaked lime) and lead compounds.

As mentioned above, water glass comes in either solid or liquid (aqueous solution). The latter is preferable due to its effect of preventing the leaching. Aqueous solution of water glass should usually have pH 9–14.6, depending on the composition and concentration. As mentioned above, for water glass to produce its effect of preventing the leaching of hazardous metals, it is necessary that water glass uniformly wets waste (or comes into intimate contact with waste) during mixing and kneading. The aqueous solution of water glass wets waste more easily as it is diluted more; however, an excessively diluted aqueous solution of water glass will give rise to a mixture in the form of slurry when mixed with waste. Such a mixture is difficult to handle and transport and has a limited possibility of water glass coming into contact with waste. With this in mind, the concentration of water glass in aqueous solution should be adjusted such that the total amount of water in the solution and water to be added optionally is 25–75 parts by weight for 100 parts by weight of waste. Dilution of water glass may be accomplished in a storage tank or in a pipe during feeding. The latter is preferable to the former which needs a large space.

Water glass may also be used in solid form because of its advantage over that in solution form. Although an aqueous solution of water glass is desirable for its effect of preventing the leaching of hazardous metals, it requires special cares in its storage, transportation, and handling because it reacts with carbon dioxide in the air to form gel. In addition, an aqueous solution of water glass needs a corrosion-resistant container, mixer, and kneader because it attacks aluminum, zinc, tin, etc. Solid water glass obviates the necessity of taking these factors into account. Moreover, solid water glass permits uniform mixing not only with waste but also with solid auxiliaries (such as coagulant, precipitating medium, chelating agent, reducing agent, and absorbent) which will increase the strength of the solidified mixture.

According to the present invention, water glass in solution form should be added in an amount of 3–30 parts by weight for 100 parts by weight of waste as mentioned above, whereas water glass in solid form should be added in an amount of 3–50 parts by weight for 100 parts by weight of waste. This is because, unlike water glass in solution form, water glass in solid form will not dissolve completely in waste. Notwithstanding, the amount of water glass in solid form should preferably be less than 30 parts by weight for 100 parts by weight of waste in order to save expenses and prevent treated waste from becoming bulky.

In the case where water glass in solid form is used, it should dissolve rapidly and wet waste uniformly (or come into uniform contact with waste) during mixing and kneading with waste so that it produces the effect of preventing the leaching of hazardous metals. The rapid dissolution of solid water glass is greatly affected by the temperature and pH of water to be added when it is mixed with waste. The rate of dissolution at 30° C. is 2 to 10 times faster than that at 10° C. To ensure that solid water glass dissolves rapidly and comes into uniform contact with waste, it is desirable to use water warmer than 30° C. In addition, solid water glass will dissolve slow in neutral water (pH 5–9), and hence it will not fully produce its effect of preventing the leaching of lead. Therefore, it is desirable to use water having pH 9 or above and warmer than 30° C. With properly adjusted pH and water temperature, it is possible to solubilize slightly soluble solid water glass or to accelerate dissolution of soluble solid water glass. This contributes to the effect of preventing the leaching of hazardous metals. However, great care should be exercised in adjustment of pH and temperature because inadequate adjustment might promote the leaching of hazardous metals from waste.

As mentioned above, the rate of dissolution of water glass depends greatly on the composition of water glass. Water glass usually has a composition represented by $M_2O \cdot nSiO_2$ (where M denotes a cation, and n is 1.2 to 4). The one in which n is 2 to 4 is desirable because it is cheap and readily available. In general, water glass is more soluble in water as the value of n decreases. The one with n<2.65 dissolves in water rapidly, whereas the one with n>3.00 is extremely slow in dissolution in water. Therefore, solid water glass with n smaller than 2.80 is desirable.

The solid water glass used in the present invention should preferably be that of powdery sodium orthosilicate for its low price.

It is within the scope of the present invention to incorporate waste or the treating agent with a calcium compound so as to adjust the amount of calcium in waste or with a gelling agent to bring about gelation of water glass. The gelling agent is exemplified by calcium salts, magnesium salts, aluminum salts, sodium bicarbonate, sodium aluminate, acids, alcohol, and aqueous solutions thereof. This embodiment of the present invention makes it possible to prevent the leaching of hazardous metals (such as lead) from waste originally containing no calcium compounds. This embodiment may be effectively applied to the treatment of dust collected from an electric furnace or zinc plating process, such dust containing no calcium compounds such as calcium hydroxide, calcium oxide, and calcium chloride.

There are several ways of incorporating the gelling agent. For example, incorporation in solid form into water glass as the treating agent, or incorporation in the form of soluble solid or aqueous solution into waste and water glass during their mixing. The former method is desirable because the gelling agent is uniformly mixed with waste and solid water glass.

Since solid water glass is more readily soluble in an alkaline aqueous solution, it is desirable to add water having pH 9 or above, as mentioned above. However, it is always necessary to provide the alkaline aqueous solution separately using its special storage tank and piping. Such additional equipment is not necessary if a mixture of solid water glass and sodium hydroxide is used as the treating agent. Such a mixture will dissolve rapidly to produce the effect of preventing the leaching of hazardous metals. The amount of sodium hydroxide for this purpose varies depending on the kind of solid water glass used and the required performance of the treating agent. Usually, 5–50 parts by weight of sodium hydroxide is used for 100 parts by weight of solid water glass. An adequate amount should be selected, remembering that the solubility of solid water glass increases with the increasing amount of sodium hydroxide. Sodium hydroxide should preferably be used in powder form so that it produces its effect easily. However, being deliquescent, sodium hydroxide powder tends to cake the treating agent, reducing its flowability in the storage tank. One way of approaching this problem is to use sodium hydroxide in the form of granules or pellets of adequate size not harmful to preventing the leaching. Another way is to coat the surface of sodium hydroxide with a water-soluble polymer or mix sodium hydroxide with an anti-caking agent, such as silica gel, diatomaceous earth, bentonite, active clay, stearate, acid clay, active bauxite, active alumina, and aluminum silicate.

The disadvantage of using water glass as the treating agent in the present invention is that the treated waste is weaker than that obtained with cement. This is a problem in the case where the treated waste is required to have a high strength. This problem is readily solved by incorporating waste with solid water glass in combination with silica sand, which is commercially available, in natural form in some case. Silica sand finer than 1 mm in particle diameter is preferable; the selection of grain size depends on the strength required, the amount of the treating agent, and the price of silica sand. Likewise, the amount of silica sand varies depending on the strength required, the amount of the treating agent, and the price of silica sand. An adequate amount is 10–100 parts by weight for 100 parts by weight of solid water glass. The effect of silica sand is probably due to the bonding of silica sand particles by water glass. It should be noted that silica sand functions also as an anti-caking agent when the treating agent is incorporated with sodium hydroxide as mentioned above.

The waste treatment method of the present invention has been mentioned above. It is not known how this method stabilizes hazardous metals such as lead. Presumably, upon reaction with calcium compounds (such as calcium hydroxide, calcium oxide, and calcium chloride), water glass forms a gel which encloses and solidifies calcium compounds and lead compounds.

The dilution of the treating agent (whose principal constituent is water glass) with water permits the treating agent to come into intimate contact with waste, bringing about uniform reaction. This produces the effect of preventing the leaching of hazardous metals.

Curing the mixture of waste and the treating agent, which follows mixing and kneading, advances the above-mentioned reaction, thereby increasing the strength of the mixture and ensuring the effect of preventing the leaching of hazardous metals.

Water glass used in the present invention may be solid water glass. When waste is incorporated with solid water glass, the resulting mixture should preferably be kneaded together with alkaline water (pH 9 or above) warmer than 30° C. so as to dissolve solid water glass rapidly and bring it intimate contact with waste for the desired effect of preventing the leaching of hazardous metals.

Water glass may be used in combination with a gelling agent, which upon reaction with water glass forms a gel to seal and solidify hazardous metals.

Water glass may also be used in combination with sodium hydroxide, which promotes the dissolution of solid water glass in water and hence permits water glass to come into intimate contact with waste for the desired effect of preventing the leaching of hazardous metals.

Water glass may also be used in combination with silica sand, which increases the strength of the solidified mixture of waste and the treating agent because water glass binds silica sand particles together.

BEST MODE FOR CARRYING OUT THE INVENTION

The invention will be described in more detail with reference to the following examples, which are not intended to restrict the scope of the invention.

Comparative Example 1

Three samples (A, B, and C) of fly ash were collected by bag filters at three municipal waste incineration facilities. Their analytical data are shown in Table 1. They were tested as such for leaching according to Notification No. 13 of the Environment Agency. (The leaching test in the following complies with this procedure.)

TABLE 1

| Analyses of fly ash from municipal waste incinerating facilities (wt %) | | | |
|---|---|---|---|
| Analyte | Fly ash (A) | Fly ash (B) | Fly ash (C) |
| Pb | 0.9 | 0.2 | 0.1 |
| $Ca(OH)_2$ | 6.9 | 14.6 | 8.8 |

COMPARATIVE EXAMPLE 2

50 g each of the above-mentioned three fly ash samples (A, B, and C) was mixed with 15 g of normal portland cement (made by Ube Cement Co., Ltd.), and the resulting mixture was kneaded with 25 g of water. The kneaded product (containing 30 parts by weight of cement for 100 parts by weight of fly ash) was solidified and cured for 7 days. The solidified product was tested for leaching.

EXAMPLE 1

50 g each of the above-mentioned three fly ash samples (A, B, and C) was mixed with a water glass solution composed of 13.2 g of liquid sodium silicate ("J sodium silicate No. 3", 38% solids, made by Nippon Kagaku Kogyo Co., Ltd.) and 21.8 g of water. The resulting mixture was kneaded. The kneaded product (containing 10 parts of water glass as solids for 100 parts by weight of fly ash) was solidified and cured for 7 days. The solidified product was tested for leaching. Incidentally, "solids" in water glass means the total amount of $M_2O \cdot nSiO_2$ (where M denotes a cation) in solid water glass.

EXAMPLE 2

50 g of the above-mentioned fly ash sample (A) was mixed with 5.0 g of sodium silicate ("J sodium silicate No. 3", 100% solids, made by Nippon Kagaku Kogyo Co., Ltd.). The resulting mixture was kneaded with 30.0 g of water. The kneaded product (containing 10 parts by weight of water glass as solids for 100 parts by weight of fly ash) was solidified and cured for 7 days. The solidified product was tested for leaching.

Table 2 shows the results of the leaching tests in Comparative Examples 1 and 2 and Examples 1 and 2.

TABLE 2

| | | Amount of lead leached out of fly ash (ppm) | | |
|---|---|---|---|---|
| | Treating agent | Fly ash (A) | Fly ash (B) | Fly ash (C) |
| Comparative Example 1 | No treatment | 439 | 50 | 23 |
| Comparative Example 2 | Cement (30 pbw) | 13 | 1.8 | 0.6 |
| Example 1 | Water glass solution (10 pbw) | N.D. | 0.7 | N.D. |
| Example 2 | Solid water glass (10 pbw) | 13 | — | — |

N.D. Limit of detection lower than 0.1 ppm.

Comparison of Example 1 with Comparative Examples 1 and 2 reveals that it is possible to reduce the leaching of lead more effectively by adding cement (30 pbw) to fly ash than by adding nothing to fly ash. However, the effect of cement is not satisfactory. By contrast, the incorporation of water glass solution (10 pbw as solids) into fly ash (which accords with the present invention) is more effective in preventing the leaching of lead than the incorporation of cement (30 pbw). Comparison of Example 2 with Comparative Example 2 reveals that solid water glass is as effective as cement even though its amount is one-third that of cement. Comparison of Example 1 with Example 2 reveals that Water glass solution is more effective than solid water glass if the amount as solids is the same.

COMPARATIVE EXAMPLE 3

A sample of fly ash (D) collected by a bag filter in a municipal waste incinerating facility was analyzed. The results are shown in Table 3. This sample, without treatment, was tested for leaching. The results are shown in Table 3.

TABLE 3

| Results of Analysis and Leaching Test | |
|---|---|
| Analyte | Results |
| Pb | 0.65 wt % |
| Calcium compounds | 64.8 wt % |
| Amount of Pb leached out | 240 ppm |

COMPARATIVE EXAMPLE 4

50 g of the above-mentioned fly ash sample (D) was mixed with a water glass solution composed of 13 g of liquid-sodium silicate ("J sodium silicate No. 3", 38% solids, made by Nippon Kagaku Kogyo Co., Ltd.) and 2 g of water. The resulting mixture was kneaded. The kneaded product contains 10 g of water or 20 parts by weight for 100 parts by weight of fly ash. The kneaded product was cured for 1 day and then crushed and classified through a sieve with 2-mm opening. The sample (30 g) that had passed through the sieve was tested for leaching.

COMPARATIVE EXAMPLE 5

The same procedure as Comparative Example 4 was repeated, except that the water glass solution was replaced by the one composed of 13 g of liquid water glass (38% solids) and 32 g of water. The kneaded product contains 40 g of water or 80 parts by weight for 100 parts by weight of fly ash.

EXAMPLE 3

The same procedure as Comparative Example 4 was repeated, except that the water glass solution was replaced by the one composed of 13 g of liquid water glass (38% solids) and 7 g of water. The kneaded product contains 15 g of water or 30 parts by weight for 100 parts by weight of fly ash.

EXAMPLE 4

The same procedure as Comparative Example 4 was repeated, except that the water glass solution was replaced by the one composed of 13 g of liquid water glass (38% solids) and 17 g of water. The kneaded product contains 25 g of water or 50 parts by weight for 100 parts by weight of fly ash.

EXAMPLE 5

The same procedure as Comparative Example 4 was repeated, except that the water glass solution was replaced by the one composed of 13 g of liquid water glass (38% solids) and 22 g of water. The kneaded product contains 30 g of water or 60 parts by weight for 100 parts by weight of fly ash.

EXAMPLE 6

The same procedure as Comparative Example 4 was repeated, except that the water glass solution was replaced by the one composed of 13 g of liquid water glass (38% solids) and 27 g of water. The kneaded product contains 35 g of water or 70 parts by weight for 100 parts by weight of fly ash.

Table 4 shows the results of the leaching tests in Comparative Examples 4 and 5 and Examples 3 to 6.

TABLE 4

| Sample | Total amount of water (pbw) | Properties of kneaded product | Amount of Pb leached out (ppm) |
| --- | --- | --- | --- |
| Comparative Example 4 | 20 | like dry soil | 50 |
| Example 3 | 30 | like soil | 10 |
| Example 4 | 50 | like slightly moist soil | 2 |
| Example 5 | 60 | like moist soil | 1 |
| Example 6 | 70 | like moist soil | 1 |
| Comparative Example 5 | 80 | like mud | 5 |

It is noted from Table 4 that the effect of preventing the leaching of lead is not satisfactory when the amount of water is 20 parts by weight for 100 parts by weight of fly ash. By contrast, an excess amount of water (80 parts by weight) gives rise to a mud-like kneaded product which is difficult to handle. Therefore, it is concluded that an adequate amount of water is 25–75 parts by weight judging from the amount of lead leached out and the properties of the kneaded product.

COMPARATIVE EXAMPLE 6

50 g of the fly ash sample (D) was mixed with 22 g of water. The resulting mixture was kneaded with 13 g of the water glass solution (containing 38% solids). The kneaded product contains 30 g of water or 60 parts by weight for 100 parts by weight of fly ash. The kneaded product was cured for 1 day and then crushed and classified through a sieve with 2-mm opening. The sample (30 g) that had passed through the sieve was tested for leaching.

EXAMPLE 7

50 g of the fly ash sample (D) was mixed with 13 g of the water glass solution (containing 38% solids). The resulting mixture was kneaded witch 22 g of water. The kneaded product contains 30 g of water or 60 parts by weight for 100 parts by weight of fly ash. The kneaded product was cured for 1 day and then crushed and classified through a sieve with 2-mm opening. The sample (30 g) that had passed through the sieve was tested for leaching.

Table 5 shows the results of the leaching tests in Comparative Example 6 and Example 7.

TABLE 5

| Sample | Total amount of water (pbw) | Properties of kneaded product | Amount of Pb leached out (ppm) |
| --- | --- | --- | --- |
| Comparative Example 6 | 60 | like moist soil | 35 |
| Example 7 | 60 | like moist soil | 1 |

It is noted from Table 5 that a better result is obtained when waste is mixed with the treating agent and then water is added than when waste is mixed with water and then the treating agent is added.

COMPARATIVE EXAMPLE 7

Fly ash sample (D) was mixed with water glass solution composed of 13 g of sodium orthosilicate in powder form (made by Nippon Kagaku Kogyo Co., Ltd.) and 10 g of water. The mixture was kneaded. The kneaded product contains 10 g of water or 20 parts by weight for 100 parts by weight of fly ash. The kneaded product was cured for 1 day and then crushed and classified through a sieve with 2-mm opening. The sample (30 g) that had passed through the sieve was tested for leaching.

COMPARATIVE EXAMPLE 8

The same procedure as in Comparative Example 7 was repeated, except that the water glass solution was replaced by the one composed of 13 g of said sodium orthosilicate in powder form and 40 g of water. The kneaded product contains 40 g of water or 80 parts by weight for 100 parts by weight of fly ash.

EXAMPLE 8

The same procedure as in Comparative Example 7 was repeated, except that the water glass solution was replaced by the one composed of 13 g of said sodium orthosilicate in powder form and 15 g of water. The kneaded product contains 15 g of water or 30 parts by weight for 100 parts by weight of fly ash.

EXAMPLE 9

The same procedure as in Comparative Example 7 was repeated, except that the water glass solution was replaced by the one composed of 13 g of said sodium orthosilicate in the powder form and 25 g of water. The kneaded product contains 25 g of water or 50 parts by weight for 100 parts by weight of fly ash.

EXAMPLE 10

The same procedure as in Comparative Example 7 was repeated, except that the water glass solution was replaced by the one composed of 13 g of said sodium orthosilicate in powder form and 30 g of water. The kneaded product contains 30 g of water or 60 parts by weight for 100 parts by weight of fly ash.

EXAMPLE 11

The same procedure as in Comparative Example 7 was repeated, except that the water glass solution was replaced by the one composed of 13 g of said sodium orthosilicate in powder form and 35 g of water. The kneaded product contains 35 g of water or 70 parts by weight for 100 parts by weight of fly ash.

Table 6 shows the results of the leaching tests in Comparative Examples 7 and 8 and Examples 8 to 11.

TABLE 6

| Sample | Total amount of water (pbw) | Properties of kneaded product | Amount of Pb leached out (ppm) |
| --- | --- | --- | --- |
| Comparative Example 7 | 20 | like dry soil | 106 |
| Example 8 | 30 | like soil | 26 |
| Example 9 | 50 | like slightly moist soil | 8 |
| Example 10 | 60 | like slightly moist soil | 5 |
| Example 11 | 70 | like moist soil | 5 |
| Comparative Example 8 | 80 | like mud | 6 |

It is noted from Table 6 that the effect of preventing the leaching of lead by using solid water glass is not satisfactory when the amount of water is 20 parts by weight for 100 parts by weight of fly ash. By contrast, an excess amount of water (80 parts by weight) gives rise to a mud-like kneaded product which is difficult to handle. Therefore, it is concluded that an adequate amount of water is 25–75 parts by weight judging from the amount of lead leached out and the properties of the kneaded product.

COMPARATIVE EXAMPLE 9

A sample of fly ash (E) collected by a bag filter in a municipal waste incineration facility and a sample of dust (F) collected by an electrostatic precipitator of an electric furnace were analyzed. The results are shown in Table 7. These samples, without any treatment, were tested for leaching.

TABLE 7

| | Analytical Data (wt %) | |
| --- | --- | --- |
| Analyte | Fly ash (E) | Dust (F) |
| $Ca(OH)_2$ | 6.9 | 0 |
| CaO | 0 | 0 |
| $CaCl_2$ | 21.8 | 0 |
| Pb | 0.90 | 1.80 |

COMPARATIVE EXAMPLE 10

50 g each of said fly ash (E) and dust (F) was mixed with 10 g of normal portland cement (made by Ube Cement Co., Ltd.), and the resulting mixture was kneaded with 30 g of water. The kneaded product (containing 20 parts by weight of cement for 100 parts by weight of waste) was solidified and cured for 7 days and then crushed and classified through a sieve with 5-mm opening. The sample (30 g) that had passed through the sieve was tested for leaching.

COMPARATIVE EXAMPLE 11

An aqueous solution was prepared from 13.2 g of the above-mentioned liquid water glass (containing 38% solids) and 23.4 g of water. This aqueous solution contains 5.0 g of solids. Upon addition of calcium chloride (2.5 g), this aqueous solution became a gel rapidly. Therefore, it could not be used as the treating agent to be mixed with waste.

EXAMPLE 10

50 g of the above-mentioned fly ash (E) was mixed with 5.0 g of sodium silicate powder ("Sodium silicate powder No. 2", n=2.50, 100% solids, made by Nippon Kagaku Kogyo Co., Ltd.). The mixture was kneaded with 30.0 g of water. The kneaded product contains 10 parts by weight of water glass (as solids) for 100 parts by weight of fly ash. The kneaded product was solidified and cured for 7 days and then crushed and classified through a sieve with 5-mm opening. The sample (30 g) that had passed through the sieve was tested for leaching.

EXAMPLE 11

50 g of the above-mentioned fly ash (E) was mixed with 5.0 g of said sodium silicate powder (n=3.15, 100% solids). The mixture was kneaded with 30.0 g of water. The kneaded product contains 10 parts by weight of water glass (as solids) for 100 parts by weight of fly ash. The kneaded product was solidified and cured for 7 days and then crushed and classified through a sieve with 5-mm opening. The sample (30 g) that had passed through the sieve was tested for leaching.

EXAMPLE 12

50 g of the above-mentioned fly ash (E) was mixed with 5.0 g of said sodium silicate powder (n=3.15, 100% solids). The mixture was kneaded with 30.0 g of warm water (at 30° C.). The kneaded product contains 10 parts by weight of water glass (as solids) for 100 parts by weight of fly ash. The kneaded product was solidified and cured for 7 days and then crushed and classified through a sieve with 5-mm opening. The sample (30 g) that had passed through the sieve was tested for leaching.

EXAMPLE 13

50 g of the above-mentioned fly ash (E) was mixed with 5.0 g of said sodium silicate powder (n=2.50, 100% solids). The mixture was kneaded with 30.0 g of alkaline water (pH 9.0). The kneaded product contains 10 parts by weight of water glass (as solids) for 100 parts by weight of fly ash. The kneaded product was solidified and cured for 7 days and then crushed and classified through a sieve with 5-mm opening. The sample (30 g) that had passed through the sieve was tested for leaching.

EXAMPLE 14

50 g of the above-mentioned fly ash (E) was mixed with 5.0 g of said sodium silicate powder (n=2.50, 100% solids). The mixture was kneaded with 30.0 g of warm alkaline water (pH 9.0, at 30° C.). The kneaded product contains 10 parts by weight of water glass (as solids) for 100 parts by weight of fly ash. The kneaded product was solidified and cured for 7 days and then crushed and classified through a sieve with 5-mm opening. The sample (30 g) that had passed through the sieve was tested for leaching.

EXAMPLE 15

50 g of the above-mentioned dust (F) was mixed with 5.0 g of said sodium silicate powder (n=2.50, 100% solids) and 2.5 g of calcium chloride. The mixture was kneaded with 30.0 g of water. The kneaded product contains 10 parts by weight of water glass (as solids) for 100 parts by weight of dust. The kneaded product was solidified and cured for 7 days and then crushed and classified through a sieve with 5-mm opening. The sample (30 g) that had passed through the sieve was tested for leaching. Table 8 shows the results of the leaching tests in Comparative Examples 9 and 10 and Examples 10 to 15.

TABLE 8

| | | Amount of lead leached out (ppm) | |
|---|---|---|---|
| Sample | Treating agent | Fly ash (E) | Dust (F) |
| Comparative Example 9 | Without treatment | 433 | 9.5 |
| Comparative Example 10 | Cement | 26 | 3.5 |
| Example 10 | Solid water glass (n = 2.50) | 1.6 | — |
| Example 11 | Solid water glass (n = 3.15) | 12 | — |
| Example 12 | Solid water glass (n = 3.15), water at 30° C. | 1.1 | — |
| Example 13 | Solid water glass (n = 3.15), water pH 9.0 | 1.4 | — |
| Example 14 | Solid water glass (n = 2.50), water at 30° C., pH 9.0 | 0.73 | — |
| Example 15 | Solid water glass (n = 2.50), calcium chloride | — | 1.2 |

The comparison of Example 10 with Comparative Examples 9 and 10 reveals that cement is effective in reducing the leaching of lead but solid water glass is more effective than cement.

The comparison of Example 10 with Example 11 reveals that the effect of solid water glass varies depending on the $SiO_2/Na_2O$ ratio (n). In other words, powder sodium silicate No. 2 (n=2.50) in Example 10 is superior to powder sodium silicate No. 3 (n=3.15) in Example 11 in the effect of preventing the leaching of lead. This result suggests that solid water glass (n<2.80) is preferable to solid water glass (n>2.80). The probable reason for this is that solid water glass with a smaller value of n is more readily soluble in water and hence comes into closer contact with waste.

The comparison of Example 11 with Example 12 reveals that warm water (at 30° C.) dissolves solid water glass sufficiently and this enhances the effect of the solid water glass which is not readily soluble in cold water. It is apparently desirable to use warm water.

The comparison of Example 11 with Example 13 reveals that alkaline water (pH 9) dissolved solid water glass sufficiently and this enhances the effect of the solid water glass which is not readily soluble in neutral water. It is apparently desirable to use alkaline water.

The comparison of Example 10 with Example 14 reveals that warm alkaline water (pH 9.0, at 30° C.) enhances the effect of solid water glass in preventing the leaching of lead.

The result of Comparative Example 11 was that the water glass solution gels instantaneously when calcium chloride is added. This gelation prevents the water glass solution from being mixed with waste. However, solid water glass can be mixed with waste even when it is used in combination with calcium chloride, as shown in Example 15. The comparison of Example 15 with Comparative Examples 10 and 11 reveals that solid water glass is more effective than water glass solution in preventing the leaching of lead when it is used in combination with calcium chloride as a gelling agent. Also, the combination of solid water glass and calcium chloride produces a better effect than cement. The foregoing suggests that water glass in the form of solid is desirable from the standpoint of its good handling properties and its ability to be applied to a variety of wastes.

COMPARATIVE EXAMPLE 12

50 g of the above-mentioned fly ash (D) was mixed with 6.41 g of "Sodium silicate powder No. 3" (n=3.15, 78.0% solids, made by Nippon Kagaku Kogyo Co., Ltd.) as the treating agent. The mixture was kneaded with 30.0 g of water. The kneaded product contains 10 parts by weight of water glass (as solids) for 100 parts by weight of fly ash. The kneaded product was solidified and cured for 7 days and then crushed and classified through a sieve with 5-mm opening. The sample (30 g) that had passed through the sieve was tested for leaching.

COMPARATIVE EXAMPLE 13

The same procedure as in Comparative Example 12 was repeated, except that the treating agent was replaced by 6.37 g of "Sodium silicate powder No. 2" (n=2.50, 78.5% solids, made by Nippon Kagaku Kogyo Co., Ltd.). The kneaded product contains 10 parts by weight of water glass (as solids) for 100 parts by weight of fly ash.

COMPARATIVE EXAMPLE 14

The same procedure as in Comparative Example 12 was repeated, except that the treating agent was replaced by 6.45 g of "Sodium silicate powder No. 1" (n=2.15, 77.5% solids, made by Nippon Kagaku Kogyo Co., Ltd.). The kneaded product contains 10 parts by weight of water glass (as solids) for 100 parts by weight of fly ash.

COMPARATIVE EXAMPLE 15

The same procedure as in Comparative Example 12 was repeated, except that the treating agent was replaced by 5.15 g of anhydrous sodium metasilicate (n=1.0, 97.0% solids, made by Nippon Kagaku Kogyo Co., Ltd.). The kneaded product contains 10 parts by weight of water glass (as solids) for 100 parts by weight of fly ash.

COMPARATIVE EXAMPLE 16

The same procedure as in Comparative Example 12 was repeated, except that the treating agent was replaced by 6.06 g of sodium metasilicate monohydrate ("Drymeta", n=1.0, 82.5% solids, made by Nippon Kagaku Kogyo Co., Ltd.). The kneaded product contains 10 parts by weight of water glass (as solids) for 100 parts by weight of fly ash.

COMPARATIVE EXAMPLE 17

The same procedure as in Comparative Example 12 was repeated, except that the treating agent was replaced by 8.70 g of sodium metasilicate pentahydrate (n=1.0, 57.5% solids, made by Nippon Kagaku Kogyo Co., Ltd.). The kneaded product contains 10 parts by weight of water glass (as solids) for 100 parts by weight of fly ash.

COMPARATIVE EXAMPLE 18

The same procedure as in Comparative Example 12 was repeated, except that the treating agent was replaced by 12.0 g of sodium metasilicate nonahydrate (n=1.0, 41.5% solids, made by Nippon Kagaku Kogyo Co., Ltd.). The kneaded product contains 10 parts by weight of water glass (as solids) for 100 parts by weight of fly ash.

EXAMPLE 16

The same procedure as in Comparative Example 12 was repeated, except that the treating agent was replaced by 5.46 g of powdery sodium orthosilicate (n=0.5, 91.5% solids, made by Nippon Kagaku Kogyo Co., Ltd.). The kneaded product contains 10 parts by weight of water glass (as solids) for 100 parts by weight of fly ash.

EXAMPLE 17

50 g of the above-mentioned fly ash (D) was mixed with a mixture of 6.41 g of "Sodium silicate powder No. 3" (n=3.15, 78.0% solids) and 2 g of sodium hydroxide powder, as the treating agent. The mixture was kneaded with 30.0 g of water. The kneaded product contains 10 parts by weight of water glass (as solids) for 100 parts by weight of fly ash. The kneaded product was solidified and cured for 7 days and then crushed and classified through a sieve with 5-mm opening. The sample (30 g) that had passed through the sieve was tested for leaching.

EXAMPLE 18

The same procedure as in Example 17 was repeated, except that the treating agent was replaced by a mixture of 6.37 g of "Sodium silicate powder No. 2" (n=2.50, 78.5% solids) and 2 g of sodium hydroxide powder. The kneaded product contains 10 parts by weight of water glass (as solids) for 100 parts by weight of fly ash.

EXAMPLE 19

The same procedure as in Example 17 was repeated, except that the treating agent was replaced by a mixture of 6.45 g of "Sodium silicate powder No. 1" (n=2.15, 77.5% solids) and 2 g of sodium hydroxide powder. The kneaded product contains 10 parts by weight of water glass (as solids) for 100 parts by weight of fly ash.

EXAMPLE 20

The same procedure as in Example 17 was repeated, except that the treating agent was replaced by a mixture of 5.15 g of said anhydrous sodium metasilicate (n=1.0, 97.0% solids) and 2 g of sodium hydroxide powder. The kneaded product contains 10 parts by weight of water glass (as solids) for 100 parts by weight of fly ash.

EXAMPLE 21

The same procedure as in Example 17 was repeated, except that the treating agent was replaced by a mixture of 6.06 g of said sodium metasilicate monohydrate ("Drymeta", n=1.0, 82.5% solids) and 2 g of sodium hydroxide powder. The kneaded product contains 10 parts by weight of water glass (as solids) for 100 parts by weight of fly ash.

EXAMPLE 22

The same procedure as in Example 17 was repeated, except that the treating agent was replaced by a mixture of 8.70 g of said sodium metasilicate pentahydrate (n=1.0, 57.5% solids) and 2 g of sodium hydroxide powder. The kneaded product contains 10 parts by weight of water glass (as solids) for 100 parts by weight of fly ash.

EXAMPLE 23

The same procedure as in Example 17 was repeated, except that the treating agent was replaced by a mixture of 12.0 g of said sodium metasilicate nonahydrate (n=1.0, 41.5% solids) and 2 g of sodium hydroxide powder. The kneaded product contains 10 parts by weight of water glass (as solids) for 100 parts by weight of fly ash.

EXAMPLE 24

The same procedure as in Example 17 was repeated, except that the treating agent was replaced by a mixture of 5.46 g of said powdery sodium orthosilicate (n=0.5, 91.5% solids) and 2 g of sodium hydroxide. The kneaded product contains 10 parts by weight of water glass (as solids) for 100 parts by weight of fly ash.

Table 9 shows the results of the leaching tests in Comparative Examples 12 to 18 and Examples 16 to 24.

TABLE 9

| Type of solid water glass | Sample | Amount of Pb leached out (ppm) | Sample (with NaOH) | Amount of Pb leached out (ppm) |
| --- | --- | --- | --- | --- |
| Sodium silicate No. 3 | Comparative Example 12 | 27 | Example 17 | 10 |
| Sodium silicate No. 2 | Comparative Example 13 | 31 | Example 18 | 13 |
| Sodium silicate No. 1 | Comparative Example 14 | 30 | Example 19 | 13 |
| Anhydrous sodium metasilicate | Comparative Example 15 | 62 | Example 20 | 22 |
| Sodium metasilicate monohydrate | Comparative Example 16 | 23 | Example 21 | 9 |
| Sodium metasilicate pentahydrate | Comparative Example 17 | 47 | Example 22 | 19 |
| Sodium metasilicate nonahydrate | Comparative Example 18 | 46 | Example 23 | 28 |
| Powdery sodium orthosilicate | Comparative Example 16 | 11 | Example 24 | 8 |

It is apparent from Table 9 that among various kinds of solid water glass used, powdery sodium orthosilicate is the most effective in preventing the leaching of lead. It is also apparent that sodium hydroxide greatly enhances the effect of preventing the leaching of lead when it is added to any other kinds of solid water glass than sodium orthosilicate.

COMPARATIVE EXAMPLE 19

500 g of fly ash (D) was incorporated with 54.6 g of said powdery sodium orthosilicate, and the resulting mixture was kneaded with 300 g of water. The kneaded product was solidified and cured for 7 days in a cylindrical container. The cured product was tested for uniaxial compression strength.

EXAMPLE 25

The same procedure as in Comparative Example 19 was repeated, except that the treating agent was replaced by a mixture of 54.6 g of said powdery sodium orthosilicate and 40 g of silica sand.

Table 10 shows the results of the leaching tests in Comparative Example 19 and Example 25.

TABLE 10

| Sample | Compression strength (kgf/cm$^2$) |
|---|---|
| Comparative Example 19 | <0.1 (unmeasurable) |
| Example 25 | 0.8 |

It is apparent from Table 10 that silica sand increases the strength of the treated waste.

COMPARATIVE EXAMPLE 20

50 g of the above-mentioned fly ash (D) was incorporated with an aqueous solution of 6.49 g of said liquid water glass (38% solids) dissolved in 27.5 g of water. The resulting mixture was kneaded. The kneaded product contains 5 parts by weight of water glass (as solids) for 100 parts by weight of fly ash. The kneaded product without being cured was crushed and classified through a sieve with 2-mm opening. The sample (30 g) which had passed through the sieve was tested for leaching.

EXAMPLES 26-1 and 26-2

50 g of the above-mentioned fly ash (D) was incorporated with an aqueous solution of 6.49 g of said liquid water glass (38% solids) dissolved in 27.5 g of water. The resulting mixture was kneaded. The kneaded product contains 5 parts by weight of water glass (as solids) for 100 parts by weight of fly ash. The kneaded product was cured at normal temperature (20° C.) for 24 hours (in Example 26-1) or 168 hours (in Example 26-2). The cured product was crushed and classified through a sieve with 2-mm opening. The sample (30 g) which had passed through the sieve was tested for leaching.

EXAMPLES 27-1 to 27-4

The same procedure as in Example 26 was repeated, except that curing was carried out for 24 hours at 40° C., 60° C., 80° C., and 100° C., respectively.

EXAMPLES 28-1 to 28-4

The same procedure as in Example 26 was repeated, except that curing was carried out at 60° C. for 0.5 hour, 2 hours, 6 hours, and 18 hours, respectively.

Table 11 shows the results of the leaching tests in Comparative Example 20 and Examples 26 to 28.

TABLE 11

| Sample | Curing time (h) | Curing temp. (°C.) | Amount of Pb leached out (ppm) |
|---|---|---|---|
| Comparative Example 20 | 0 | — | 90 |
| Example 26-1 | 24 | 20 | 42 |
| Example 26-2 | 168 | 20 | 5.0 |
| Example 27-1 | 24 | 40 | 3.6 |
| Example 27-2 | 24 | 60 | 0.6 |
| Example 27-3 | 24 | 80 | 0.2 |
| Example 27-4 | 24 | 100 | <0.1 |
| Example 28-1 | 0.5 | 60 | 71 |
| Example 28-2 | 2 | 60 | 42 |
| Example 28-3 | 6 | 60 | 2.9 |
| Example 28-4 | 18 | 60 | 0.8 |

The comparison of Examples 26 to 28 with Comparative Example 20 reveals that it is possible to prevent the leaching of lead when waste is mixed with water glass, followed by kneading and curing. Examples 26 and 28 suggest that the effect of preventing the leaching of lead is proportional to the length of curing time. Further, comparison of Example 26 with 28 and Examples 27-1 to 27-4 suggest that the effect of preventing the leaching of lead is proportional to curing time as well as curing temperature.

Exploitation in Industry

The waste treatment method of the present invention, when applied to industrial wastes containing calcium compounds (such as calcium hydroxide, calcium oxide, and calcium chloride), especially waste incineration fly ash containing slaked lime, stabilizes hazardous metals, particularly lead, in wastes and prevents them from leaching out of wastes.

According to the present invention, it is possible to cure the mixture of waste and the treating agent in a short time at a prescribed temperature, making it ready for dumping. This is desirable in the case where there is no sufficient space for curing in the dumping site.

The waste treating method Of the present invention provides a cured solid product Which can be used as concrete aggregate and subbase course material containing very little leachable hazardous metals.

We claim:

1. A waste treatment method, comprising the steps of:
   mixing ash and fly ash resulting from incineration of waste containing calcium compounds such as calcium hydroxide, calcium oxide, and calcium chloride with a treating agent composed mainly of water glass solution and optional water such that the total amount of water is 25–75 parts by weight for 100 parts by weight of the ash and fly ash resulting from incineration of waste; and
   kneading the resulting mixture.

2. A waste treatment method as claimed in claim 1, wherein the mixing and kneading of waste with a treating agent is followed by curing.

3. A waste treatment method as claimed in claim 1, wherein curing lasts for at least 6 hours.

4. A waste treatment method as claimed in claim 2, wherein curing is carried out at 40° C. to 100° C.

5. A waste treatment method as claimed in claim 4, wherein curing is carried out by heating with remaining heat evolved by a waste incinerator.

6. A waste treatment method as claimed in any of claims 1 to 5, wherein the concentration of the solution and the amount of water to be added are adjusted such that the total amount of water in the solution and water to be added is 25–75 parts by weight for 100 parts by weight of the ash and fly ash resulting from incineration of waste.

7. A waste treatment method, comprising the steps of mixing waste containing calcium compounds such as calcium hydroxide, calcium oxide, and calcium chloride with a treating agent composed mainly of solid water glass and optional water such that the total amount of water is 25–75 parts by weight for 100 parts by weight of the waste; and kneading the resulting mixture.

8. A waste treatment method as claimed in claim 7, wherein the solid water glass is added in an amount of 3–50 parts by weight for 100 parts by weight of waste.

9. A waste treatment method as claimed in claim 7, wherein the waste and a treating agent are mixed with water at a temperature of at least 30° C.

10. A waste treatment method as claimed in claim 7, wherein the waste and a treating agent are mixed with water having a pH value of at least 9.

11. A waste treatment method as claimed in claim 7, wherein the solid water glass is one whose major constituent is represented by $M_2O \cdot nSiO_2$ with a ratio of $SiO_2/M_2O$ being 2.80 or below, wherein M denotes a cation.

12. A waste treatment method as claimed in claim 7, wherein the solid water glass is sodium orthosilicate in powder form.

13. A waste treatment method as claimed in claim 7, wherein the waste and the treating agent are mixed and kneaded together with a gelling agent.

14. A waste treatment method as claimed in claim 7, wherein the waste and the treating agent are mixed and kneaded together with sodium hydroxide (NaOH).

15. A waste treatment method as claimed in claim 7, wherein the waste and the treating agent are mixed and kneaded together with silica sand.

16. A waste treatment method as claimed in any of claims 8 to 15, wherein the waste is fly ash resulting from incineration of waste.

17. A waste treatment method as claimed in claim 7, wherein the waste is fly ash resulting from incineration of wastes.

18. A waste treatment method as claimed in claim 8, wherein the waste is fly ash resulting from incineration of wastes.

19. A waste treatment method as claimed in claim 9, wherein the waste is fly ash resulting from incineration of wastes.

20. A waste treatment method as claimed in claim 10, wherein the waste is fly ash resulting from incineration of wastes.

21. A waste treatment method as claimed in claim 11, wherein the waste is fly ash resulting from incineration of wastes.

22. A waste treatment method as claimed in claim 12, wherein the waste is fly ash resulting from incineration of wastes.

23. A waste treatment method as claimed in claim 13, wherein the waste is fly ash resulting from incineration of wastes.

24. A waste treatment method as claimed in claim 14, wherein the waste is fly ash resulting from incineration of wastes.

25. A waste treatment method as claimed in any of claims 1 to 5 or 8 to 15, wherein the mixing and kneading of waste with a treating agent is followed by curing.

26. A waste treatment method as claimed in claim 25, wherein curing lasts for at least 6 hours.

27. A waste treatment method as claimed in claim 25, wherein curing is carried out at 40° C. to 100° C.

28. A waste treatment method as claimed in claim 27, wherein curing is carried out by heating with remaining heat evolved by the waste incinerator.

* * * * *